US011625207B2

(12) United States Patent
Tokuchi

(10) Patent No.: US 11,625,207 B2
(45) Date of Patent: Apr. 11, 2023

(54) INFORMATION PROCESSING APPARATUS AND NON-TRANSITORY COMPUTER READABLE MEDIUM FOR SUPPRESSION OR PREVENTION OF WORK FROM BEING ILLEGALLY SENT TO EXTERNAL APPARATUS

(71) Applicant: FUJIFILM BUSINESS INNOVATION CORP., Tokyo (JP)

(72) Inventor: Kengo Tokuchi, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 477 days.

(21) Appl. No.: 16/657,075

(22) Filed: Oct. 18, 2019

(65) Prior Publication Data
US 2020/0364013 A1 Nov. 19, 2020

(30) Foreign Application Priority Data
May 14, 2019 (JP) ............................. JP2019-091241

(51) Int. Cl.
G06F 3/12 (2006.01)
(52) U.S. Cl.
CPC .......... G06F 3/1239 (2013.01); G06F 3/1204 (2013.01); G06F 3/1238 (2013.01); G06F 3/1274 (2013.01)
(58) Field of Classification Search
None
See application file for complete search history.

(56) References Cited

U.S. PATENT DOCUMENTS

2008/0201784 A1* 8/2008 Someshwar .......... G06F 3/1238
358/1.14
2011/0179053 A1* 7/2011 Pandolfi .................. G06F 16/93
707/E17.014
2014/0355068 A1* 12/2014 Cudak ................ H04N 1/32149
358/3.28

FOREIGN PATENT DOCUMENTS

| EP | 2565834 A1 * | 3/2013 | ......... G06F 3/04817 |
|---|---|---|---|
| JP | 2002-351745 A | 12/2002 | |
| JP | 2002-366531 A | 12/2002 | |
| JP | 2003-30359 A | 1/2003 | |
| JP | 2005-275828 A | 10/2005 | |
| JP | 2006-004179 A | 1/2006 | |
| JP | 2006-127347 A | 5/2006 | |
| JP | 2008-217572 A | 9/2008 | |
| JP | 2009-217661 A | 9/2009 | |

(Continued)

OTHER PUBLICATIONS

English translation of Japanese Patent Application 2015-056918, corresponding to Japanese Patent Application Publication 2016-178466. (Year: 2015).*

(Continued)

Primary Examiner — Thomas D Lee
(74) Attorney, Agent, or Firm — Oliff PLC

(57) ABSTRACT

An information processing apparatus includes an accepting unit and a determining unit. The accepting unit accepts first information and second information about a work, the first information being information related to intended use of the work, the second information being information related to an acquisition means of the work. The determining unit determines, based on the accepted first information and second information, whether to allow or not allow the work to be sent to an external apparatus.

18 Claims, 5 Drawing Sheets

(56) References Cited

FOREIGN PATENT DOCUMENTS

| JP | 2010-238229 A | | 10/2010 | | |
|---|---|---|---|---|---|
| JP | 2016178466 A | * | 10/2016 | ......... | G06F 3/04817 |

OTHER PUBLICATIONS

Feb. 14, 2023 Notice of Reasons for Refusal Issued in Japanese Patent Application No. 2019-091241.

* cited by examiner

FIG. 5

- INPUT INTENDED USE

☐ PRIVATE USE
  ☐ SHARE WITH OTHERS
  ☐ EDUCATIONAL USE ← 42
  ☐ BUSINESS USE
  ☐ OTHERS

- ACQUISITION MEANS

☐ CREATOR ← 44
  ☐ LEGAL OWNER
  ☐ OTHERS

- INPUT EVIDENCE OF INTENDED USE

■ PRIVATE USE
IDENTIFICATION INFORMATION OF APPARATUS THAT IS PERMITTED TO USE WORK:

PASSWORD:

TELEPHONE NUMBER:

EMAIL ADDRESS:

46

INFORMATION PROCESSING APPARATUS AND NON-TRANSITORY COMPUTER READABLE MEDIUM FOR SUPPRESSION OR PREVENTION OF WORK FROM BEING ILLEGALLY SENT TO EXTERNAL APPARATUS

CROSS-REFERENCE TO RELATED APPLICATIONS

This application is based on and claims priority under 35 USC 119 from Japanese Patent Application No. 2019-091241 filed May 14, 2019.

BACKGROUND

(i) Technical Field

The present disclosure relates to an information processing apparatus and a non-transitory computer readable medium.

(ii) Related Art

A work is sent from a certain apparatus to another apparatus (hereinafter referred to as "an external apparatus") in some cases.

Japanese Unexamined Patent Application Publication No. 2009-217661 describes a system that extracts a content item to be determined as to whether the content item infringes a copyright.

Japanese Unexamined Patent Application Publication No. 2002-366531 describes a system that checks copyright infringement of a content item in a web page being browsed by a user and informs a server of the found copyright infringement.

Japanese Unexamined Patent Application Publication No. 2003-30359 describes an apparatus that issues a notification for an apparatus if copyright information embedded in a content item is detected.

Japanese Unexamined Patent Application Publication No. 2008-217572 describes an apparatus that extracts feature data from a copyright-check target content item. If any content item having the same feature is detected, the apparatus determines that the copyright-check target content item is not allowed to be transferred.

SUMMARY

In some cases, a work is illegally sent from an apparatus to an external apparatus.

Aspects of non-limiting embodiments of the present disclosure relate to suppression or prevention of a work from being illegally sent to an external apparatus.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including an accepting unit and a determining unit. The accepting unit accepts first information and second information about a work, the first information being information related to intended use of the work, the second information being information related to an acquisition means of the work. The determining unit determines, based on the accepted first information and second information, whether to allow or not allow the work to be sent to an external apparatus.

BRIEF DESCRIPTION OF THE DRAWINGS

An exemplary embodiment of the present disclosure will be described in detail based on the following figures, wherein:

FIG. 5 illustrates a screen;
FIG. 6 illustrates a screen.

DETAILED DESCRIPTION

Figure 1:
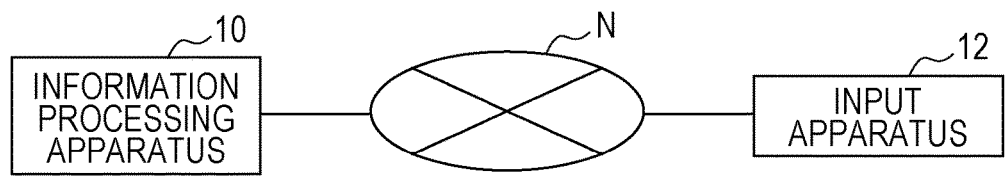
FIG. 1 is a block diagram illustrating the configuration of an information processing system according to the exemplary embodiment.

Now, an information processing system according to an exemplary embodiment will be described with reference to FIG. 1. FIG. 1 illustrates an example of the configuration of the information processing system according to the exemplary embodiment.

The information processing system according to the exemplary embodiment includes an information processing apparatus 10 and one or more input apparatuses 12. The information processing system may further include other apparatuses.

The information processing apparatus 10 and an input apparatus 12 may communicate with another apparatus via a communication network N. The communication network N is, for example, a network such as a local area network (LAN), the Internet, or the like. The communication network N may be established by wired communication or by wireless communication such as Wi-Fi (registered trademark). For example, the information processing apparatus 10 and the input apparatus 12 are connected to the communication network N by wireless communication or wired communication to communicate with another apparatus via the communication network N. The information processing apparatus 10 and the input apparatus 12 may also communicate with another apparatus by short-range wireless communication or the like instead of using the communication network N. Examples of the short-range wireless communication include Bluetooth (registered trademark), radio frequency identification (RFID), and near-field communication (NFC).

The information processing apparatus 10 is an apparatus that is configured to, based on determination information, determine whether to allow or not allow transmission-target work data to be sent to an external apparatus. Note that the information processing apparatus 10 may be a server.

Examples of the work data include document data (e.g., text data), image data (e.g., still image data and moving image data), music data, and sound data, alone or in combination, with no limitation on types and details thereof. For example, works illustrated in the Copyright Law are included in the concept range of the work in this embodiment. The concept range of the work in this embodiment includes, for example, written works (e.g., novels, scenarios, and papers), musical works, dance works, artistic works (e.g., paintings, prints, sculptures, and craftworks), architectural works, graphical works (e.g., maps and drawings), film works (e.g., films, television programs, and video games), photographic works, program works, and secondary works thereof. It is needless to say that the concept range of the work in this embodiment further includes other works.

The determination information is information used for the above determination and includes intended use information (first information) and acquisition means information (second information). The intended use information is information related to intended use of transmission-target work data. The acquisition means information is information related to an acquisition means of transmission-target work data. The acquisition means of work data is, for example, information regarding how the work data has been obtained. For example, a user may obtain work data according to a contract (e.g., onerous assignment such as purchasing, gratuitous assignment, or leasing) or may create work data by themselves. The acquisition means of work data is identified from a written contract, a receipt, a purchase history, or the like. The determination information may further include evidence information. The evidence information is information regarding evidence proving the intended use or acquisition means. Examples of the evidence include a contract regarding the use of work data, evidence (e.g., an identification card issued by a public or private institution) proving the identification or legal qualification of a user who is trying to use or send work data to an external apparatus, information for identifying a user (e.g., the user's face image or biological information), and the like. Examples of the identification card include a driver's license, an occupational certificate, a copy of a family register, a certificate of residence, an Individual Number card, and the like. It is needless to say that other evidence may be used.

To send work data to an external apparatus means, for example, to upload the work data to an external apparatus such as a server or to send the work data from an apparatus that stores the work data to another apparatus. The external apparatus as the uploading destination may be the information processing apparatus 10.

The input apparatus 12 is an apparatus configured to receive the determination information. The input apparatus 12 may be any kind of apparatus as long as the determination information may be input. For example, the input apparatus 12 is a personal computer (hereinafter referred to as "a PC"), a tablet PC, a smartphone, a mobile phone, an apparatus including a scanner, or the like. The apparatus including a scanner may be a multifunction peripheral or the like including a printer in addition to the scanner or may be the scanner. It is needless to say that each of these apparatuses is merely an example of the input apparatus 12. Note that work data sent to an external apparatus may be used by the input apparatus 12 or may be used by an apparatus other than the input apparatus 12.

Figure 2:
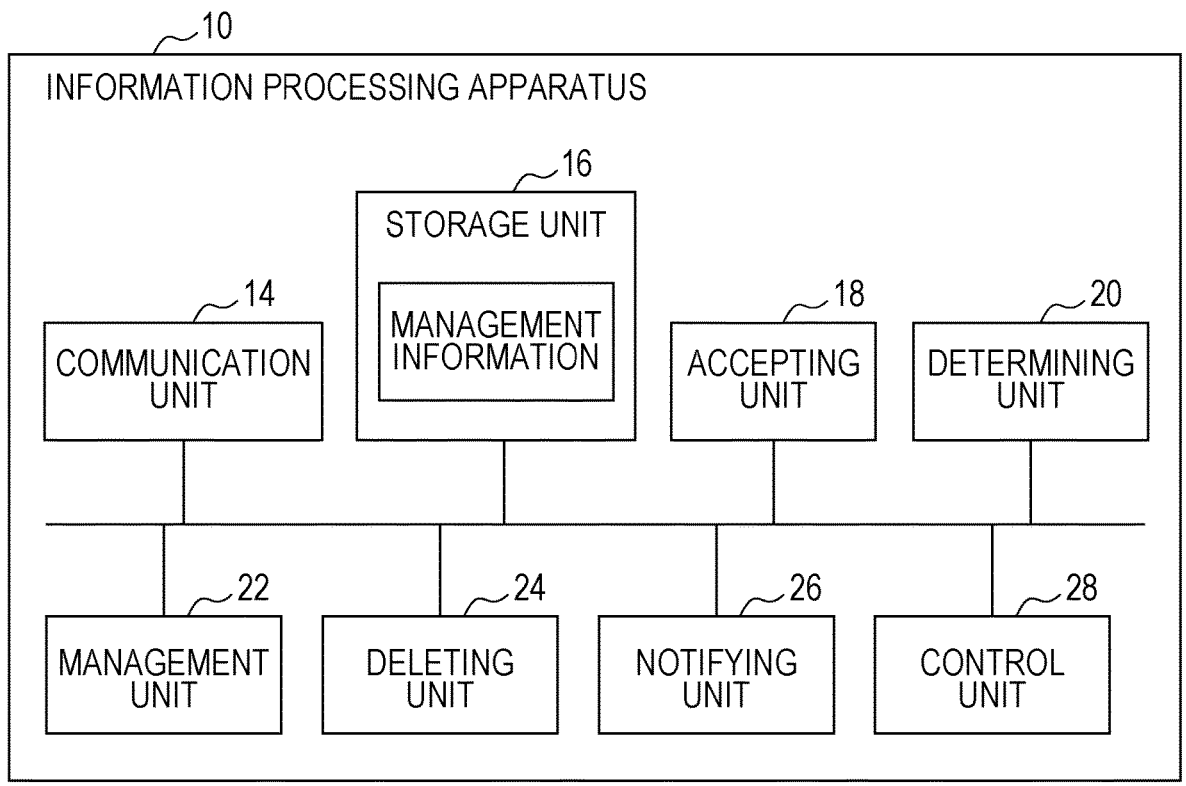
FIG. 2 is a block diagram illustrating the configuration of an information processing apparatus according to the exemplary embodiment.

Now, the configuration of the information processing apparatus 10 will be described in detail with reference to FIG. 2. FIG. 2 illustrates an example of the configuration of the information processing apparatus 10.

A communication unit 14 is a communication interface and has a function for sending information to another apparatus and a function for receiving information from another apparatus. The communication unit 14 may have a wireless communication function or a wired communication function. The communication unit 14 may communicate with another apparatus via the communication network N by wireless communication or wired communication or may communicate with another apparatus by short-range wireless communication or the like instead of using the communication network N.

A storage unit 16 is one or more storage regions that store various kinds of information. Each of the storage regions is realized by, for example, one or more storage apparatuses (e.g., a physical drive such as a hard disk drive or memory) provided for the information processing apparatus 10.

The storage unit 16 stores management information. The management information is information used for management of transmission-target work data and the determination information used for determination as to whether to allow or not allow the work data to be sent to an external apparatus. Specifically, each piece of work data and a corresponding piece of determination information are registered in association with each other in the management information. Note that the management information may be stored in an apparatus other than the information processing apparatus 10 (e.g., another server) instead of being stored in the storage unit 16.

An accepting unit 18 is configured to accept determination information. Upon input of determination information into the input apparatus 12, the determination information is sent from the input apparatus 12 to the information processing apparatus 10 and accepted by the accepting unit 18. If work data is sent from the input apparatus 12 to the information processing apparatus 10, the work data is accepted by the accepting unit 18.

The intended use information and the acquisition means information may be extracted from attribute information of transmission-target work data, and the extracted intended use information and acquisition means information may be accepted by the accepting unit 18. For example, a control unit 38 (see FIG. 3) of the input apparatus 12 extracts the intended use information and acquisition means information from the attribute information of transmission-target work data. If either one of the intended use information and acquisition means information is included in the attribute information of transmission-target work data, the one of the intended use information and acquisition means information may be extracted from the attribute information. In addition, if the evidence information is included in the attribute information, the evidence information may also be extracted from the attribute information. The extraction may alternatively be performed by the accepting unit 18. For example, the attribute information of transmission-target work data may be sent from the input apparatus 12 to the information processing apparatus 10, and the intended use information, the acquisition means information, and/or the evidence information may be extracted from the attribute information by the accepting unit 18.

A determining unit 20 is configured to, based on determination information, determine whether to allow or not allow transmission-target work data to be sent to an external apparatus. For example, the determining unit 20 allows the work data to be sent to an external apparatus if the acquisition means of the work data matches intended use, and does not allow the work data to be sent to an external apparatus and if the acquisition means of the work data does not match intended use. In addition, the determining unit 20 may allow the work data to be sent to an external apparatus if the intended use or acquisition means is proved by using the evidence information, and may not allow the work data to be sent to an external apparatus if the intended use or acquisition means fails to be proved by using the evidence information.

For example, in a case where the acquisition means information indicates that a user who is trying to send work data to an external apparatus is a creator or a copyright holder of the work data, regardless of the intended use of the work data, the determining unit 20 allows the work data to be sent to the external apparatus. The determining unit 20 may alternatively determine, based on the evidence information, whether a user who is trying to send work data to an external apparatus is a creator or a copyright holder of the work data.

In a case where the acquisition means information indicates that a user who is trying to send work data to an external apparatus is not a creator or a copyright holder of the work data, the determining unit 20 may determine, based on the intended use of the work data, whether to allow or not allow the work data to be sent to the external apparatus.

In the following case, for example, the determining unit 20 allows the work data to be sent to an external apparatus. The case is where the intended use does not require the copyright holder's permission according to the Copyright Law, that is, where the work may be used without the copyright holder's permission, although the permission is usually required because the copyright is restricted according to the Copyright Law. For example, the intended use is private use or educational use, the determining unit 20 allows the work data to be sent to an external apparatus.

If the intended use requires the copyright holder's permission according to the Copyright Law, the determining unit 20 determines, based on a contract regarding the use of the work data, whether to allow or not allow the work data to be sent to an external apparatus. For example, if the intended use is business use, the determining unit 20 makes the determination based on the contract. If a user who is trying to send the work data to an external apparatus has made such a contract with its copyright holder that the work data is allowed to be sent to an external apparatus, the determining unit 20 allows the work data to be sent to an external apparatus. If the user has not made such a contract, the determining unit 20 does not allow the work data to be sent to an external apparatus. Whether such a contract is made or not is proved by evidence information.

A management unit 22 is configured to manage transmission-target work data and the determination information used for determining whether to allow or not allow the work data to be sent to an external apparatus. Specifically, the management unit 22 registers each piece of work data and a corresponding piece of determination information in association with each other in the management information. The management unit 22 may encrypt all or part of the determination information and associate the encrypted information with the work data. Note that the management unit 22 may be omitted from the information processing apparatus 10, and the work data and the determination information are not necessarily managed.

A deleting unit 24 is configured to, once the determining unit 20 has completed determination, delete the determination information used for the determination from the information processing apparatus 10. In a case where the determination information is managed by the management unit 22, the deleting unit 24 may leave the determination information. The determination information may be deleted or may not be deleted in accordance with an instruction of a user who is trying to send work data to an external apparatus. Note that the deleting unit 24 may be omitted from the information processing apparatus 10, and the determination information is not necessarily deleted.

A notification unit 26 is configured to, if a scheduled use period of work data that is set by a user exceeds a predetermined permitted use period, issue a notification to prompt a user to modify the scheduled use period. For example, in a case where the use of work data is permitted according to the contract regarding the use of work data, the predetermined permitted use period is a permitted use period specified by the contract. Information indicating the notification is, for example, sent from the information processing apparatus 10 to the input apparatus 12 that has received the determination information. The permitted use period of work data is a period during which the work data sent to and stored in the external apparatus is available. The work data being available means, for example, to be able to view the work data, to be able to download the work data, to be able to reproduce the work data, or the like.

A control unit 28 is configured to control operations of the other units of the information processing apparatus 10.

Figure 3:
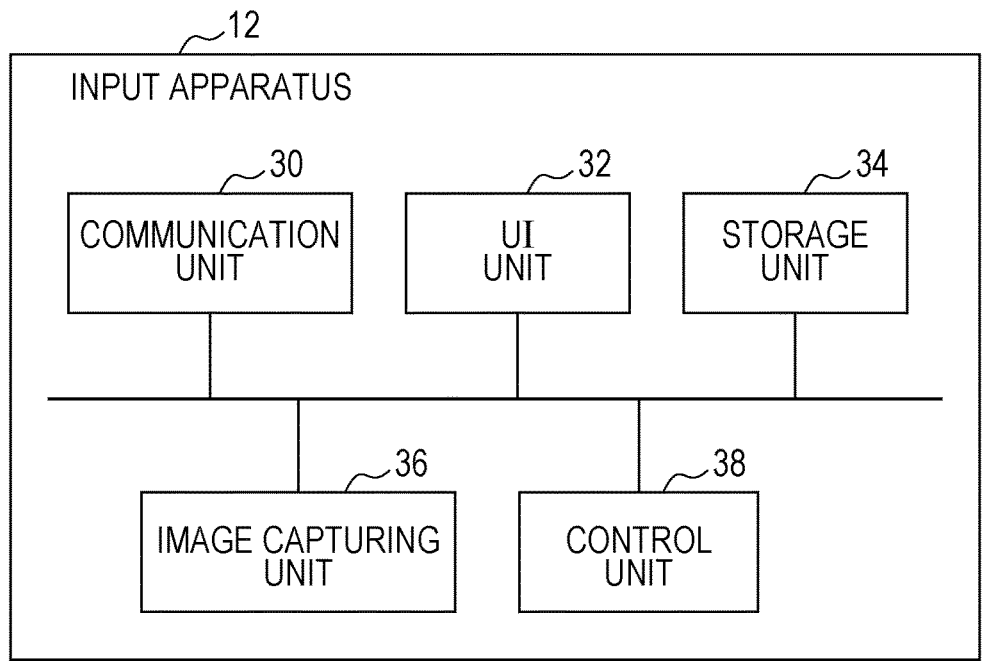
FIG. 3 is a block diagram illustrating the configuration of an input apparatus according to the exemplary embodiment.

Now, the configuration of the input apparatus 12 will be described in detail with reference to FIG. 3. FIG. 3 illustrates an example of the configuration of the input apparatus 12. The input apparatus 12 herein is a PC, a tablet PC, a smartphone, or a mobile phone as an example.

A communication unit 30 is a communication interface and has a function for sending information to another apparatus and a function for receiving information from another apparatus. The communication unit 30 may have a wireless communication function or a wired communication function. The communication unit 30 may communicate with another apparatus via the communication network N by wireless communication or wired communication or may communicate with another apparatus by short-range wireless communication or the like instead of using the communication network N.

A user interface (UI) unit 32 is a user interface and includes a display unit and an operation unit. The display unit is a display apparatus such as a liquid crystal display. The operation unit is an input apparatus such as a keyboard, input keys, or an operation panel. The UI unit 32 may be a touch panel that serves as both the display unit and the operation unit, for example. All or part of the determination information may be input to the input apparatus 12 through the UI unit 32.

A storage unit 34 is one or more storage regions that store various kinds of information. Each of the storage regions is realized by, for example, one or more storage apparatuses (e.g., a physical drive such as a hard disk drive or memory) provided for the input apparatus 12.

An image capturing unit 36 is a camera and is configured to capture an image of a subject to generate image data (e.g., still image data or moving image data) representing the subject. All or part of the determination information may be input to the input apparatus 12 upon capturing an image by the image capturing unit 36. Note that the image capturing unit 36 may be omitted from the input apparatus 12. In this case, the determination information is input to the input apparatus 12 through the UI unit 32.

In a case where the input apparatus 12 is an apparatus including a scanner (e.g., a multifunction peripheral), the scanner may scan all or part of the determination information so that all or part of the determination information may be input to the input apparatus 12.

The determination information that is input to the input apparatus 12 is sent from the input apparatus 12 to the information processing apparatus 10 to be used by the determining unit 20 to make determination.

The control unit 38 is configured to control operations of the other units of the input apparatus 12.

Figure 4:
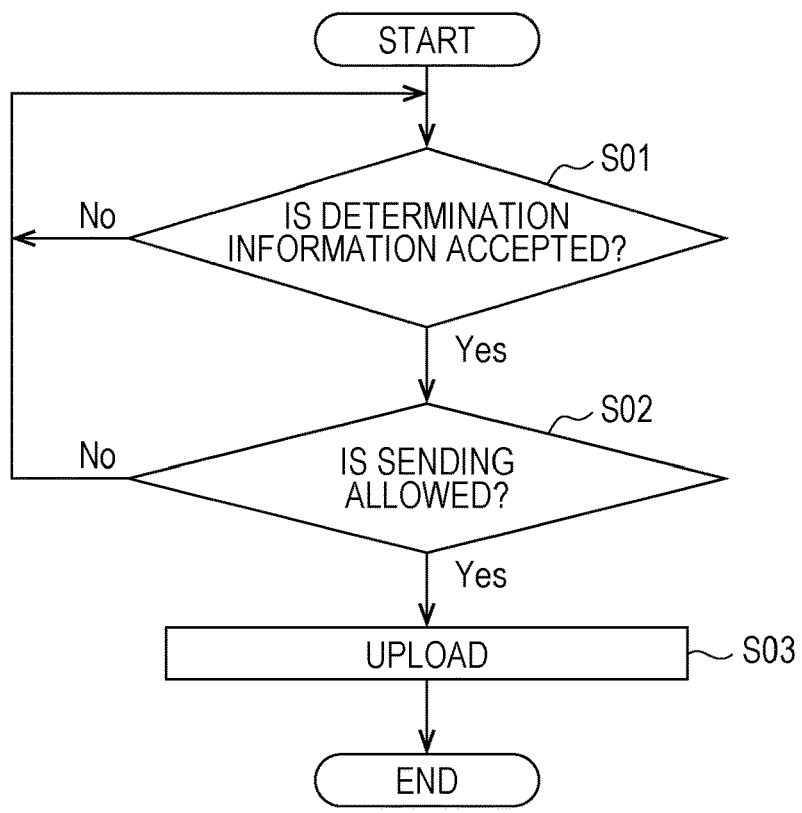
FIG. 4 is a flowchart illustrating a process executed by the information processing system according to the exemplary embodiment.

Now, a general process executed by the information processing system according to the exemplary embodiment will be described with reference to FIG. 4. FIG. 4 is a flowchart illustrating an example of the general process. In the following case, as an example, a user uploads work data stored in the input apparatus 12 to an external apparatus such as a server.

Upon the accepting unit 18 of the information processing apparatus 10 accepting determination information sent from the input apparatus 12 (S01, Yes), based on the determination information, the determining unit 20 of the information processing apparatus 10 determines whether to allow or not allow work data to be sent to the external apparatus (S02).

If the determining unit 20 allows the work data to be sent to the external apparatus (S02, Yes), the work data is uploaded (S03). For example, information indicating allowance is sent from the information processing apparatus 10 to the input apparatus 12, and the input apparatus 12 receives the information indicating allowance and uploads the upload-target work data to an uploading destination. The information indicating allowance may be displayed on the display unit of the UI unit 32 of the input apparatus 12. If the input apparatus 12 receives the information indicating allowance from the information processing apparatus 10, and if the user gives an uploading instruction by operating the UI unit 32 of the input apparatus 12, the input apparatus 12 may upload the work data to the uploading destination. It is needless to say that the input apparatus 12 that has received the information indicating allowance may automatically upload the work data without any instruction from the user. By referring to the information indicating allowance, the user is able to understand that the work data is allowed to be uploaded.

If the determining unit 20 does not allow the work data to be sent to the external apparatus (S02, No), the process returns to step S01. In this case, information indicating prohibition may be sent from the information processing apparatus 10 to the input apparatus 12 to be displayed on the display unit of the UI unit 32. In addition, if the accepting unit 18 does not accept determination information (S01, No), the process returns to step S01. By referring to the information indicating prohibition, the user is able to understand that the work data is not allowed to be uploaded. That is, the user is able to understand that uploading the work data is against the law or contract.

The information processing system according to the exemplary embodiment will be described in more details with reference to specific examples.

Referring to FIG. 5, a screen for inputting the intended use information and the acquisition means information will be described. FIG. 5 illustrates an example of the screen. For example, by operating the UI unit 32 of the input apparatus 12, a user designates upload-target work data and gives an instruction for executing a determination process. In response to the instruction, the control unit 38 of the input apparatus 12 causes the display unit of the UI unit 32 to display a screen 40.

On the screen 40, an intended-use designation field 42 and an acquisition-means designation field 44 are displayed.

In the intended-use designation field 42, the intended use of the work data is designated. For example, the user is able to designate the intended use among "private use", "share with others", "educational use", "business use", and "others" in the intended-use designation field 42. Upon the user designating the intended use, the control unit 38 of the input apparatus 12 causes the display unit of the UI unit 32 to display another screen for receiving evidence information corresponding to the intended use that has been designated.

In the acquisition-means designation field 44, the acquisition means of the work data is designated. For example, the user is able to designate the acquisition means among "creator" of the transmission-target work (that is, the user has created the transmission-target work), "legal owner" of the transmission-target work (that is, the user has acquired the transmission-target work obeying the law or contract), and "others" in the acquisition-means designation field 44. Upon the user designating the acquisition means, the control unit 38 of the input apparatus 12 causes the display unit of the UI unit 32 to display another screen for receiving evidence information corresponding to the acquisition means that has been designated.

Upon designation of the intended use and acquisition means on the screen 40, information indicating the intended use and acquisition means that have been designated is sent from the input apparatus 12 to the information processing apparatus 10.

For example, if the user has designated the intended use as private use in the intended-use designation field 42, as illustrated in FIG. 6, the control unit 38 of the input apparatus 12 causes the display unit of the UI unit 32 to display a screen 46 for receiving evidence information corresponding to the private use. Herein, as an example, evidence proving that the intended use of the work data is the private use are identification information (e.g., a media access control (MAC) address) for identifying an apparatus that is permitted to use the work data, a password, a telephone number of the user, and an email address of the user. On the screen 46, the user is able to input the identification information (e.g., a MAC address) for identifying an apparatus that is permitted to use the work data, the password, the telephone number of the user, and the email address of the user. The apparatus is, for example, an apparatus used when the work data is viewed, and may be the input apparatus 12 or an apparatus other than the input apparatus 12. The password, the telephone number, and the email address are necessary information for viewing the work data. For example, when the user tries to view the work data with an apparatus that is permitted to use the work data, the user is required to input the password, the telephone number, and the email address, and after all the information has been input, the user is permitted to view the work data. Note that at least one of the password, the telephone number, and the email address may be used as evidence, or image data of the user's face may be used as evidence. The information that is input on the screen 46 is sent from the input apparatus 12 to the information processing apparatus 10.

Since the indented use of the upload-target work data is private use and the evidence information corresponding to the private use is input, the determining unit 20 allows the work data to be uploaded. Information indicating allowance is sent from the information processing apparatus 10 to the input apparatus 12 and displayed on the display unit of the UI unit 32 of the input apparatus 12. By referring to the information, the user who is trying to upload the work data is able to understand that the work data is allowed to be uploaded. If the work data is allowed to be uploaded, the control unit 38 of the input apparatus 12 associates the upload-target work data with the information that has been input on the screen 46 (e.g., the identification information of the apparatus, the password, the telephone number, and the email address). Subsequently, if the user gives an instruction for uploading the work data by operating the UI unit 32 of the input apparatus 12, the input apparatus 12 uploads the work data to the uploading destination designated by the user. The work data is viewable with the apparatus having the identification information that is associated with the work data. In addition, the work data is allowed to be viewed if the password, the telephone number, and the email address that are associated with the work data are input to the apparatus used for viewing.

The upload-target work data may also be sent from the input apparatus 12 to the information processing apparatus 10. In this case, the management unit 22 registers the upload-target work data and the information that is input on the screens 40 and 46 (i.e., information indicating the private use, the identification information of the apparatus, the password, the telephone number, and the email address) in association with each other in the management information. The upload-target work data may be sent to the information processing apparatus 10 before the determination process executed by the determining unit 20 or may be sent to the information processing apparatus 10 after the determination process executed by the determining unit 20. In a case where the work data is sent from the input apparatus 12 to the information processing apparatus 10 before the determination process executed by the determining unit 20, and in a case where the work data and the information that is input on the screens 40 and 46 are registered in association with each other in the management information, upon completion of the determination process executed by the determining unit 20, the deleting unit 24 may delete the information that is input on the screens 40 and 46 from the management information.

In addition, the information processing apparatus 10 may be the apparatus to which the work data is uploaded. In this case, the determining unit 20 allows acceptance of the work data to be uploaded. In a case where the user gives an instruction for uploading the work data by operating the UI unit 32 of the input apparatus 12, the work data is uploaded from the input apparatus 12 to the information processing apparatus 10.

Note that in a case where the user designates in the acquisition-means designation field 44 on the screen 40 that the user is the creator of the transmission-target work, display of the screen 46 may be skipped. In this case, without input of the information that is to be input on the screen 46, the determining unit 20 allows the work data to be uploaded.

Figure 7:
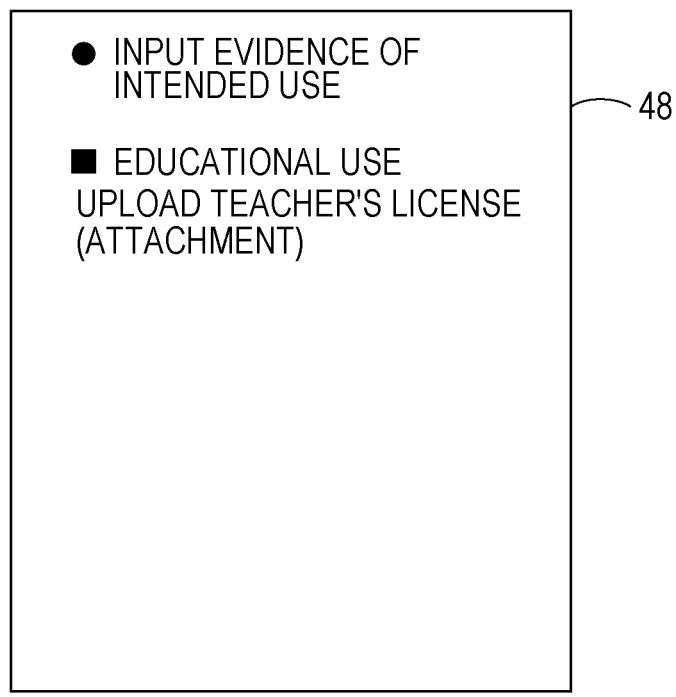
FIG. 7 illustrates a screen.

If the user designates educational use in the intended-use designation field 42 on the screen 40, as illustrated in FIG. 7, the control unit 38 of the input apparatus 12 causes the display unit of the UI unit 32 to display a screen 48 for receiving evidence information corresponding to the educational use. Herein, as an example, evidence proving that the intended use of the work data is the educational use is a teacher's license. The user is able to input image data representing a teacher's license of the user on the screen 48. For example, by capturing an image of the teacher's license with a camera or by scanning the teacher's license with a scanner, the image data representing the teacher's license may be generated. The image data representing the teacher's license that is input on the screen 48 is sent from the input apparatus 12 to the information processing apparatus 10. Note that, as evidence proving that the intended use is the educational use, information proving a predetermined educational institute, information proving a student, or the like may also be used.

Since the indented use of the upload-target work data is the educational use and the evidence information corresponding to the educational use is input, the determining unit 20 allows the work data to be uploaded. Information indicating allowance is sent from the information processing apparatus 10 to the input apparatus 12 and displayed on the display unit of the UI unit 32 of the input apparatus 12. By referring to the information, the user who is trying to upload the work data is able to understand that the work data is allowed to be uploaded. If the work data is allowed to be uploaded, the control unit 38 of the input apparatus 12 associates the upload-target work data with the image data representing the teacher's license that has been input on the screen 48. Subsequently, if the user gives an instruction for uploading the work data by operating the UI unit 32 of the input apparatus 12, the input apparatus 12 uploads the work data to an uploading destination designated by the user. The work data may be allowed to be viewed if the image data representing the teacher's license that is associated with the work data is input to the apparatus used for viewing. Note that the information processing apparatus 10 may be the uploading destination.

The upload-target work data may also be sent from the input apparatus 12 to the information processing apparatus 10. In this case, the management unit 22 registers the upload-target work data and the image data representing the teacher's license in association with each other in the management information. The upload-target work data may be sent to the information processing apparatus 10 before the determination process executed by the determining unit 20 or may be sent to the information processing apparatus 10 after the determination process executed by the determining unit 20. In a case where the work data is sent from the input apparatus 12 to the information processing apparatus 10 before the determination process executed by the determining unit 20, and in a case where the work data and the image data representing the teacher's license are registered in association with each other in the management information, upon completion of the determination process executed by the determining unit 20, the deleting unit 24 may delete the image data representing the teacher's license from the management information.

Figure 8:
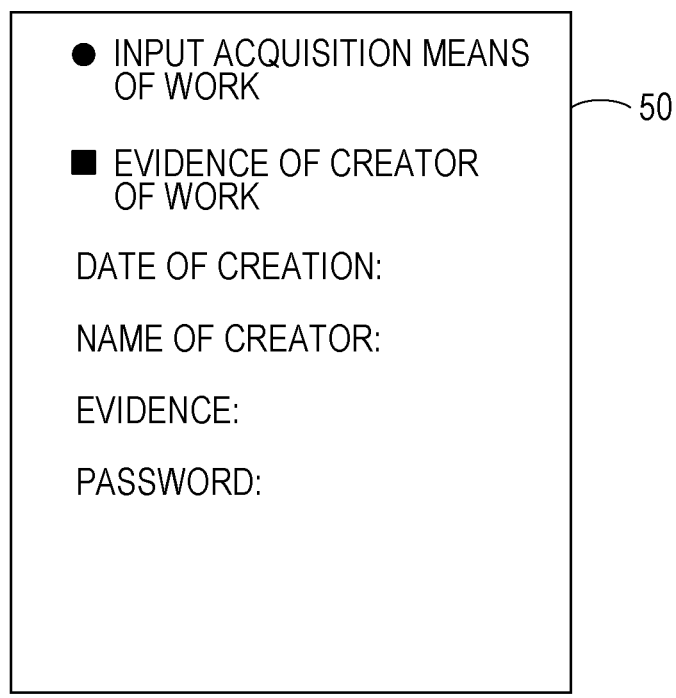
FIG. 8 illustrates a screen.

If the user designates that the user is the creator of the upload-target work in the acquisition-means designation field 44 on the screen 40, as illustrated in FIG. 8, the control unit 38 of the input apparatus 12 causes the display unit of the UI unit 32 to display a screen 50 for receiving evidence information proving that the user is the creator of the transmission-target work. Herein, as an example, the user is able to input the date of creation of the work, the name of the creator, evidence proving that the user is the creator, and a password on the screen 50. Note that the password is input if set for the work data. If no password is set for the work data, the password is not input. Examples of the evidence proving that the user is the creator include an identification card of the user, information indicating a web site that distributes the work data, and the like. For example, image data representing the identification card is input on the screen 50. Note that, from attribute information of the upload-target work data, the control unit 38 of the input apparatus 12 may extract all or part of the information that is input on the screen 50 and may cause the extracted information to be displayed on the screen 50. For example, in a case where the attribute information includes information indicating the date of creation and information indicating the creator, these pieces of information are extracted and displayed on the screen 50. In addition, in a case where the attribute information includes a classification code of the work, the classification code may be extracted and displayed on the screen 50. For example, in a case where the work is a book, a book classification code (e.g., an International Standard Book Number (ISBN)) is used, and if the attribute information includes the book classification code, the book classification code is extracted and displayed on the screen 50. It is needless to say that another classification code may also be extracted. Furthermore, in a case where the work data is image data, music data, sound data, or the like, and if embedded information is embedded in the data, the embedded information may be extracted from the work data and displayed on the screen 50. Examples of the embedded information include the date of creation of the work, the name of the creator, the name of a copyright holder, and information indicating an outline of the work, a category of the work, a data capacity, and the like. It is needless to say that other information may also be embedded in the work data.

The information that is input on the screen 50 is sent from the input apparatus 12 to the information processing apparatus 10. Since the information proving that the user is the creator is input, the determining unit 20 determines that the user who is trying to upload the work data is the creator. That is, the determining unit 20 determines that the upload-target work data has been created by the user who is trying to upload the work data.

Note that if the identification card includes the user's face image, an image of the user's current face may be captured with a camera, and face image data representing the face may be sent from the input apparatus 12 to the information processing apparatus 10 as an example of the evidence proving that the user is the creator. In a case where characteristics of a person extracted from the face image included in the identification card and characteristics of a person extracted from the face image generated by image capturing with a camera are the same or similar, the determining unit 20 determines that the user who is trying to upload the work data is the creator. In a case where characteristics of a person extracted from the face image included in the identification card and characteristics of a person extracted from the face image generated by image capturing with a camera are not the same or similar, the determining unit 20 determines that the user who is trying to upload the work data is not the creator.

Figure 9:
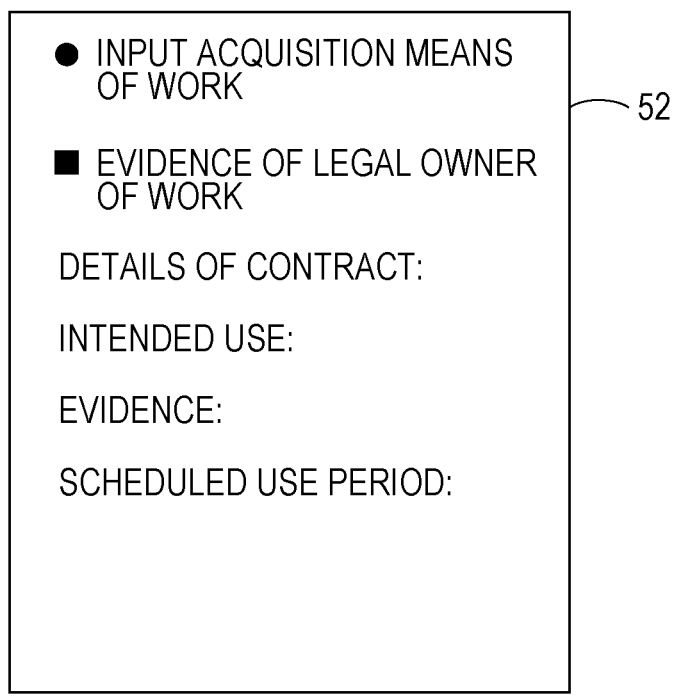
FIG. 9 illustrates a screen.

If the user designates that the user is a legal owner of the transmission-target work in the acquisition-means designation field 44 on the screen 40, as illustrated in FIG. 9, the control unit 38 of the input apparatus 12 causes the display unit of the UI unit 32 to display a screen 52 for receiving evidence information proving that the user is a legal owner of the upload-target work. Herein, as an example, the user is able to input details of a contract, intended use, evidence, and a scheduled use period on the screen 52.

For example, contract information regarding the use of the work data may be input as the details of a contract on the screen 52. For example, by capturing an image of a written contract with a camera, or by scanning a written contract with a scanner, image data representing the written contract may be generated, and the image data may be input as the details of a contract. In addition, the image data may be subjected to character recognition processing so that character information may be extracted from the image data and input as the details of a contract. As another example, if contract information is post on a web site, the uniform resource locator (URL) of the web site may be input as the details of a contract.

The intended use is input in order to determine whether the intended use is in the scope of the intended use specified by the law or contract. Intended-use choices may be displayed in the field of the intended use, and the user may select any intended use from the choices.

The evidence proves that the user is a contractor, and is an identification card of the user, for example. For example, image data representing the identification card is input on the screen 52. In addition, if the user has purchased the work data, the receipt or purchase history thereof may be input as the evidence.

The scheduled use period is a period during which the work data is made public in the uploading destination. The scheduled use period is input in order to determine whether the use period is within a permitted use period specified by the law or contract.

Note that, from attribute information of the upload-target work data, the control unit 38 of the input apparatus 12 may extract all or part of the information that is input on the screen 52 and may cause the extracted information to be displayed on the screen 52.

The information that is input on the screen 52 is sent from the input apparatus 12 to the information processing apparatus 10. If, for example, the work data is used for business use and if the intended use that is input on the screen 52 is included in the intended use specified by the contract that is input on the screen 52, the determining unit 20 allows the work data to be uploaded. Information indicating allowance is sent from the information processing apparatus 10 to the input apparatus 12 and displayed on the display unit of the UI unit 32. By referring to the information, the user is able to understand that the upload-target work data is available based on the law or contract. That is, the user is able to understand that uploading the work data is not against the law or contract.

If the intended use that is input on the screen 52 is not included in the intended use specified by the contract, the determining unit 20 does not allow the work data to be uploaded. Information indicating prohibition is sent from the information processing apparatus 10 to the input apparatus 12 and displayed on the display unit of the UI unit 32. By referring to the information, the user is able to understand that the upload-target work data is not available in light of the law or contract. That is, the user is able to understand that uploading the work data is against the law or contract.

If the receipt or purchase history is input as the evidence, the determining unit 20 may determine, based on the receipt or purchase history, whether the user who is trying to upload the work data has purchased the work data legally or not. If the user who is trying to upload the work data has purchased the work data legally, the determining unit 20 allows the work data to be uploaded. If the user who is trying to upload the work data has not purchased the work data legally, the determining unit 20 does not allow the work data to be uploaded.

In addition, if the scheduled use period that is input on the screen 52 is within the permitted use period specified by the contract, the determining unit 20 allows the work data to be uploaded. Information indicating allowance is sent from the information processing apparatus 10 to the input apparatus 12 and displayed on the display unit of the UI unit 32. By referring to the information, the user is able to understand that the scheduled use period of the upload-target work data is within the permitted use period specified by the law or contract.

If the scheduled use period that is input on the screen 52 exceeds the permitted use period specified by the contract, the determining unit 20 does not allow the work data to be uploaded. Information indicating prohibition is sent from the information processing apparatus 10 to the input apparatus 12 and displayed on the display unit of the UI unit 32. By referring to the information, the user is able to understand that the scheduled use period of the upload-target work data exceeds the permitted use period specified by the law or contract.

If the scheduled use period that is input on the screen 52 exceeds the permitted use period specified by the contract, the notification unit 26 of the information processing apparatus 10 may issue and send a notification to prompt the user to modify the scheduled use period to the input apparatus 12. In this case, information indicating the notification is displayed on the display unit of the UI unit 32. If the user gives an instruction for modifying the scheduled use period by operating the UI unit 32, the control unit 38 causes the display unit of the UI unit 32 to display the screen 52. The user is able to modify the scheduled use period on the screen 52. If the scheduled use period that has been modified is within the permitted use period specified by the contract, the work data is allowed to be uploaded.

Note that if the identification card includes the user's face image, an image of the user's current face may be captured with a camera, and face image data representing the face may be sent from the input apparatus 12 to the information processing apparatus 10 as an example of the evidence proving that the user is the contractor. In a case where characteristics of a person extracted from the face image included in the identification card and characteristics of a person extracted from the face image generated by image capturing with a camera are the same or similar, the determining unit 20 determines that the user who is trying to upload the work data is the contractor. In a case where characteristics of a person extracted from the face image included in the identification card and characteristics of a person extracted from the face image generated by image capturing with a camera are not the same or similar, the determining unit 20 determines that the user who is trying to upload the work data is not the contractor and does not allow the work data to be uploaded.

In a case where part of the intended use and the acquisition means does not satisfy a condition for allowing the work data to be uploaded, if the part of the intended use and the acquisition means that does not satisfy the condition is modified, the determining unit 20 may make determination based on the modified part of the intended use and acquisition means.

For example, in a case where work data created by a person other than the user who is trying to upload the work data is to be used for business use, as long as evidence information proving a contract for using the work data for business use is not input on the screen 52, the determining unit 20 does not allow the work data to be uploaded. In this case, information indicating prohibition is sent from the information processing apparatus 10 to the input apparatus 12 and displayed on the display unit of the UI unit 32. If the user gives an instruction for modifying the evidence information by operating the UI unit 32, the screen 52 is displayed on the display unit of the UI unit 32. On the screen 52, if the user inputs evidence information (e.g., contract information) proving the contract for using the work data for business use, the determining unit 20 makes determination based on the input evidence information.

In addition, although evidence information proving the contract for using the work data for business use is input on the screen 52, if the intended use that is input on the screen 52 is not included in the intended use specified by the contract, the work data is not allowed to be uploaded. If the user modifies the intended use on the screen 52, the determining unit 20 makes determination based on the modified intended use. If the intended use is included in the intended use specified by the contract, the determining unit 20 allows the work data to be uploaded.

Note that if the user designates "others" as the intended use on the screen 40 illustrated in FIG. 5, a screen for the user to input other intended uses is displayed. The same applies when the user designates "others" as the acquisition means.

The work data that is uploaded to an external apparatus such as a server or the information processing apparatus 10 may be used by an apparatus such as a PC or a smartphone or other apparatuses (e.g., a multifunction peripheral). For example, print-target work data may be uploaded to an external apparatus, and a multifunction peripheral may download the work data from the external apparatus and print the work data. Alternatively, a PC may download the work data, and a user may view the work data with the PC. The methods for using the work data are not limited to the above methods, and the work data may be used by any use method corresponding to the type of the work data.

The functions of units of the information processing apparatus 10 and the input apparatus 12 are achieved by cooperation of hardware and software, for example. Specifically, the information processing apparatus 10 and the input apparatus 12 have one or more processors (not shown) such as a CPU. By the one or more processors reading and executing a program stored in a storage apparatus (not shown), the functions of units of the information processing apparatus 10 and the input apparatus 12 are implemented. The program is stored in the storage apparatus via a recording medium such as a compact disc (CD) or digital versatile disc (DVD) or via a communication path such as a network. As another example, the functions of units of the information processing apparatus 10 and the input apparatus 12 may be implemented by hardware resources such as a processor, an electronic circuit, and an application specific integrated circuit (ASIC). A device such as a memory may be used for the implementation. As still another example, the functions of units of the information processing apparatus 10 and the input apparatus 12 may be implemented by a digital signal processor (DSP), a field programmable gate array (FPGA), or the like.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a processor programmed to:

accept first information and second information about a work, the first information being information related to intended use of the work, the second information being information related to an acquisition means of the work;

based on the accepted first information and second information, determine whether to allow or not allow the work to be sent to an external apparatus; and if the second information indicates that a user who is trying to send the work to the external apparatus is not a creator or a legal owner of the work, make the determination based on the intended use indicated by the first information.

2. The information processing apparatus according to claim 1,
wherein, in a case where at least part of the accepted first and second information does not satisfy a condition required to send the work to the external apparatus, if the part of the first and second information is modified, determine, based on the modified part of the first and second information, whether to allow or not allow the work to be sent to the external apparatus.

3. The information processing apparatus according to claim 2,
wherein the first information and the second information are extracted from attribute information of the work, and
wherein the processor is programmed to accept the extracted first information and second information.

4. The information processing apparatus according to claim 3, wherein the processor is programmed to:
if a scheduled use period of the work set by a user who is trying to send the work to the external apparatus exceeds a permitted use period of the work specified by a contract, issue a notification to prompt a user to modify the scheduled use period.

5. The information processing apparatus according to claim 2, wherein the processor is programmed to:
if a scheduled use period of the work set by a user who is trying to send the work to the external apparatus exceeds a permitted use period of the work specified by a contract, issue a notification to prompt a user to modify the scheduled use period.

6. The information processing apparatus according to claim 1,
wherein the first information and the second information are managed in association with the work.

7. The information processing apparatus according to claim 6,
wherein the first information and the second information are extracted from attribute information of the work, and
wherein the processor is programmed to accept the extracted first information and second information.

8. The information processing apparatus according to claim 7, wherein the processor is programmed to:
a notification unit that, if a scheduled use period of the work set by a user who is trying to send the work to the external apparatus exceeds a permitted use period of the work specified by a contract, issue a notification to prompt a user to modify the scheduled use period.

9. The information processing apparatus according to claim 6, wherein the processor is programmed to:
if a scheduled use period of the work set by a user who is trying to send the work to the external apparatus exceeds a permitted use period of the work specified by a contract, issue a notification to prompt a user to modify the scheduled use period.

10. The information processing apparatus according to claim 1, wherein the processor is programmed to:
delete the first information and the second information upon completion of the determination by the processor.

11. The information processing apparatus according to claim 10,
wherein the first information and the second information are extracted from attribute information of the work, and
wherein the processor is programmed to accept the extracted first information and second information.

12. The information processing apparatus according to claim 10, wherein the processor is programmed to:
a notification unit that, if a scheduled use period of the work set by a user who is trying to send the work to the external apparatus exceeds a permitted use period of the work specified by a contract, issue a notification to prompt a user to modify the scheduled use period.

13. The information processing apparatus according to claim 1,
wherein the first information and the second information are extracted from attribute information of the work, and
wherein the processor is programmed to accept the extracted first information and second information.

14. The information processing apparatus according to claim 13, wherein the processor is programmed to:
a notification unit that, if a scheduled use period of the work set by a user who is trying to send the work to the external apparatus exceeds a permitted use period of the work specified by a contract, issue a notification to prompt a user to modify the scheduled use period.

15. The information processing apparatus according to claim 1, wherein the processor is programmed to:
if a scheduled use period of the work set by a user who is trying to send the work to the external apparatus exceeds a permitted use period of the work specified by a contract, issue a notification to prompt a user to modify the scheduled use period.

16. The information processing apparatus according to claim 1,
wherein the processor is programmed to make the determination by using a classification code of the work or embedded information of the work.

17. A non-transitory computer readable medium storing a program causing a computer to execute a process for information processing, the process comprising:
accepting first information and second information about a work, the first information being information related to intended use of the work, the second information being information related to an acquisition means of the work;
determining, based on the accepted first information and second information, whether to allow or not allow the work to be sent to an external apparatus; and
if the second information indicates that a user who is trying to send the work to the external apparatus is not a creator or a legal owner of the work, making the determination based on the intended use indicated by the first information.

18. An information processing apparatus comprising:
means for accepting first information and second information about a work, the first information being information related to intended use of the work, the second information being information related to an acquisition means of the work;

means for determining, based on the accepted first information and second information, whether to allow or not allow the work to be sent to an external apparatus; and if the second information indicates that a user who is trying to send the work to the external apparatus is not a creator or a legal owner of the work, means for making the determination based on the intended use indicated by the first information.

* * * * *